United States Patent [19]

Burkel et al.

[11] 3,809,956

[45] May 7, 1974

[54] APPARATUS FOR ELECTRICAL DETERMINATION OF DIFFERENTIAL SPEED OF TWO ROTATING MEMBERS

[75] Inventors: Rainer Burkel, Schwieberdingen; Hans Scheyhing, Hofingen, both of Germany

[73] Assignee: Robert Bosch GmbH, Stuttgart, Germany

[22] Filed: Oct. 10, 1972

[21] Appl. No.: 295,861

[30] Foreign Application Priority Data
Nov. 26, 1971 Germany............................ 2158602

[52] U.S. Cl.................................. 317/6, 324/79 R
[51] Int. Cl............................................. H02p 5/16
[58] Field of Search ....... 317/6; 307/233; 324/79 R; 303/21 BE

[56] References Cited
UNITED STATES PATENTS 3,206,641  9/1965  Leeson et al. .......................... 317/6
3,709,565  1/1973  Jonason et al. .................. 303/21 BE Primary Examiner—James D. Trammell
Attorney, Agent, or Firm—William R. Woodward; Flynn & Frishauf

[57] ABSTRACT

A steady voltage is generated which is proportional to the quotient of the rotational rates of the two members for which it is desired to determine the slip rate. The apparatus may be used to effect coupling of the two members when the slip rate falls to or very near zero, particularly in a motor vehicle transmission. The control voltage is generated by first generating, through electrical sensors and circuits, a train of pulses having a repetition rate proportional to the rotational rate of one of the members and having a pulse width inversely proportional to the rotational rate of the other of the members, and then integrating the pulse train to provide a steady control voltage.

11 Claims, 5 Drawing Figures

APPARATUS FOR ELECTRICAL DETERMINATION OF DIFFERENTIAL SPEED OF TWO ROTATING MEMBERS

CROSS REFERENCES

German Patent No. 12 23 937; German Offenlegungschrift (unexamined published patent applicaton) No. 19 35 518.1, and German Offenlegungschrift (unexamined published patent application) No. 19 50 647.9.

This invention relates to apparatus for electrical measurement of the differential rotational rate of two rotating members and particularly for determining the relative slip rate between shafts to be coupled in the transmission system of a motor vehicle.

In order to obtain a smooth closing of the torque converter bypass coupling or of the separable isolating clutch in an automatic transmission, it is essential to bring the two halves of the coupling to approximately the same rate of rotation. When the rates of rotation of the two coupling halves are almost the same, coupling of the two together can be effected. If the difference in rotation rate is too great, a heavy jolt occurs at the time of coupling by which components of the motor vehicle are unduly stressed and driving comfort is impaired.

It is the object of this invention to avoid the disadvantages just mentioned and to provide an apparatus by which the rate of slip between the two halves of a coupling in a motor vehicle transmission can be determined.

SUBJECT MATTER OF THE PRESENT INVENTION

Briefly, the apparatus comprises a first sensor for producing a first signal of a frequency proportional to the rate of rotation ($n_1$) of the first half of the coupling, a second sensor similarly producing a second signal of a frequency proportional to the rate of rotation ($n_2$) of the second half of the coupling, both providing these signals to a circuit adapted to provide a voltage proportional to the ratio of the two frequencies, and hence to the ratio of the two rates of rotation ($n_2/n_1$). The first sensor causes the generation of a train of pulses of constant width of the frequency above specified. These pulses are integrated to provide a voltage representative of the pulse frequency. This voltage is then used to modulate the pulse width of the train of pulses triggered by the second sensor in such a way that the pulse width will be inversely proportional to the frequency of pulses generated in response to the first sensor. Thereafter, the pulses thus modulated in width are integrated to generate a voltage proportional to the desired ratio. Such a voltage can be used, with the assistance of a suitable voltage comparator stage, to cause the coupling to be closed as soon as the two rates of rotation have become sufficiently alike, that is, when the differential rotational rate has dropped to sufficiently near zero. The differential rotational rate, in relative units, is given by the expression ($n_1 - n_2)/n_1$, which may be written $1 - (n_2/n_1)$, from which it may be seen that as $n_2$ approaches equality with $n_1$, the ratio $n_2/n_1$ approaches 1, and the differential rotational rate approaches 0.

An illustrative embodiment of the invention is explained and described in more detail with reference to the accompanying drawings in which.

Figure 1:
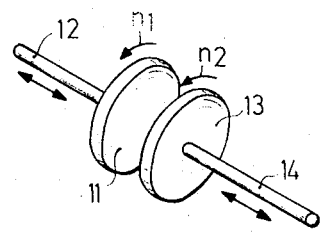
FIG. 1 is a diagrammatic sketch in perspective, of two halves of a coupling.

FIG. 1 schematically shows a first coupling member 11, which is fixed on a shaft 12 and is capable of being shifted axially on the shaft 12. The coupling member 11 rotates at the rotational speed $n_1$. On the axis of the shaft 12, a second coupling member 13 is provided opposite the first coupling member 11. The member 13 rotates at a more or less different rotational rate $n_2$ and is capable of being shifted axially on the shaft 14.

Figure 2:
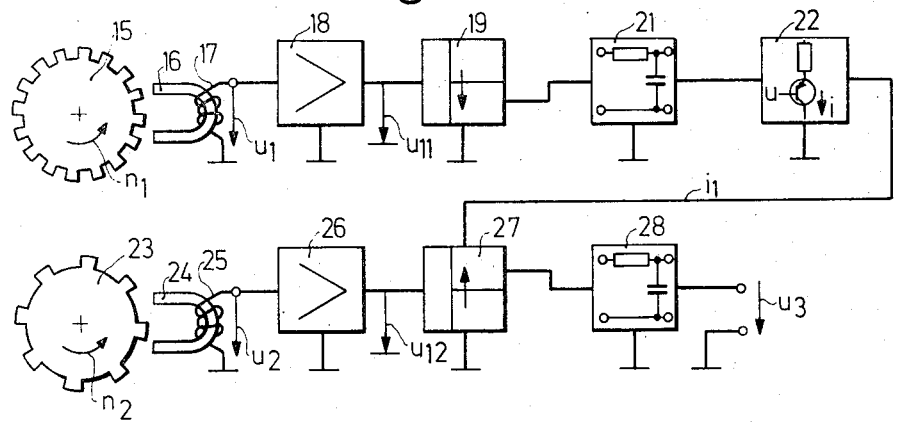
FIG. 2 is a diagram of the sensors and the related circuits (shown in block diagram)

FIG. 2 shows a block diagram of the circuit of the apparatus. A first sprocket is fixed to the first coupling member 11 and a first horseshoe magnet 16 wound with a coil 17 is provided near the edge of the sprocket 15, so as to form an inductive signal transmitter. Instead of this inductive signal transmitter, some other signal sensor can be used, of course, adapted to provide a train of electrical pulses of a frequency proportional to the rate of rotation of the coupling member 11. The output of the coil 17 of the just described first sensor is supplied, through an amplifier 18, to the input of a first monostable flipflop stage 19. The output of the first flipflop is provided to the input of a first integrating stage 21 of which the output voltage is furnished to a voltage-to-current converter 22.

A second sprocket 23 is affixed to the second coupling member 13 and a second horseshoe magnet 24 is provided to pick up inductive signals in a second coil 25 in response to the movement of the teeth of the second sprocket 23, which signals are supplied to a second amplifier 26. The output of amplifier 26 is led to a second monostable flipflop 27 with the width of the pulses controlled by a voltage supplied from a second input by the current-to-voltage converter 22. The output of the second monostable flipflop 27 is led to a second integration stage 28.

Figure 3:
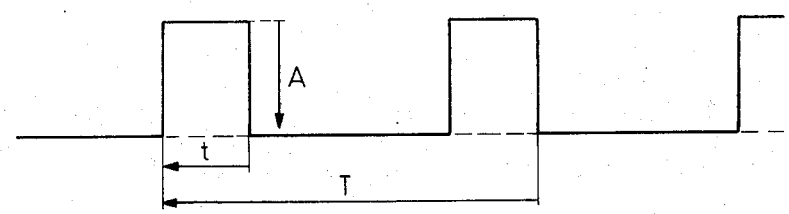
FIG. 3 is a graphical representation of a train of pulses.

FIG. 3 is a graphical representation of a pulse voltage, plotted against time, which as usual progresses to the right on the horizontal axis. Two pulses of a repetitive train rectangular impulses and the beginning of a third pulse are shown, in which the amplitude is A, the pulse width is $t$ and the impulse period is T.

Figure 4:
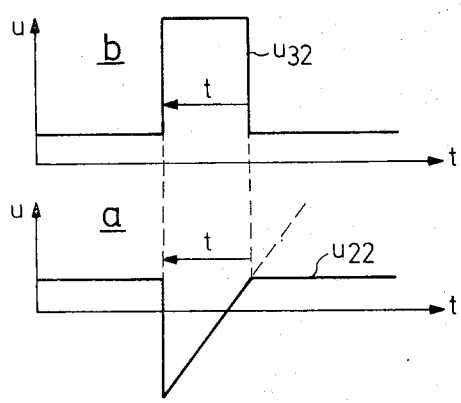
FIG. 4 is a graphical representation of the voltage at two points of the apparatus, plotted against time.

FIG. 4 shows the course of the voltage on a capacitor charged at constant current by a current pulse, as well as the resulting voltage pulse.

Figure 5:
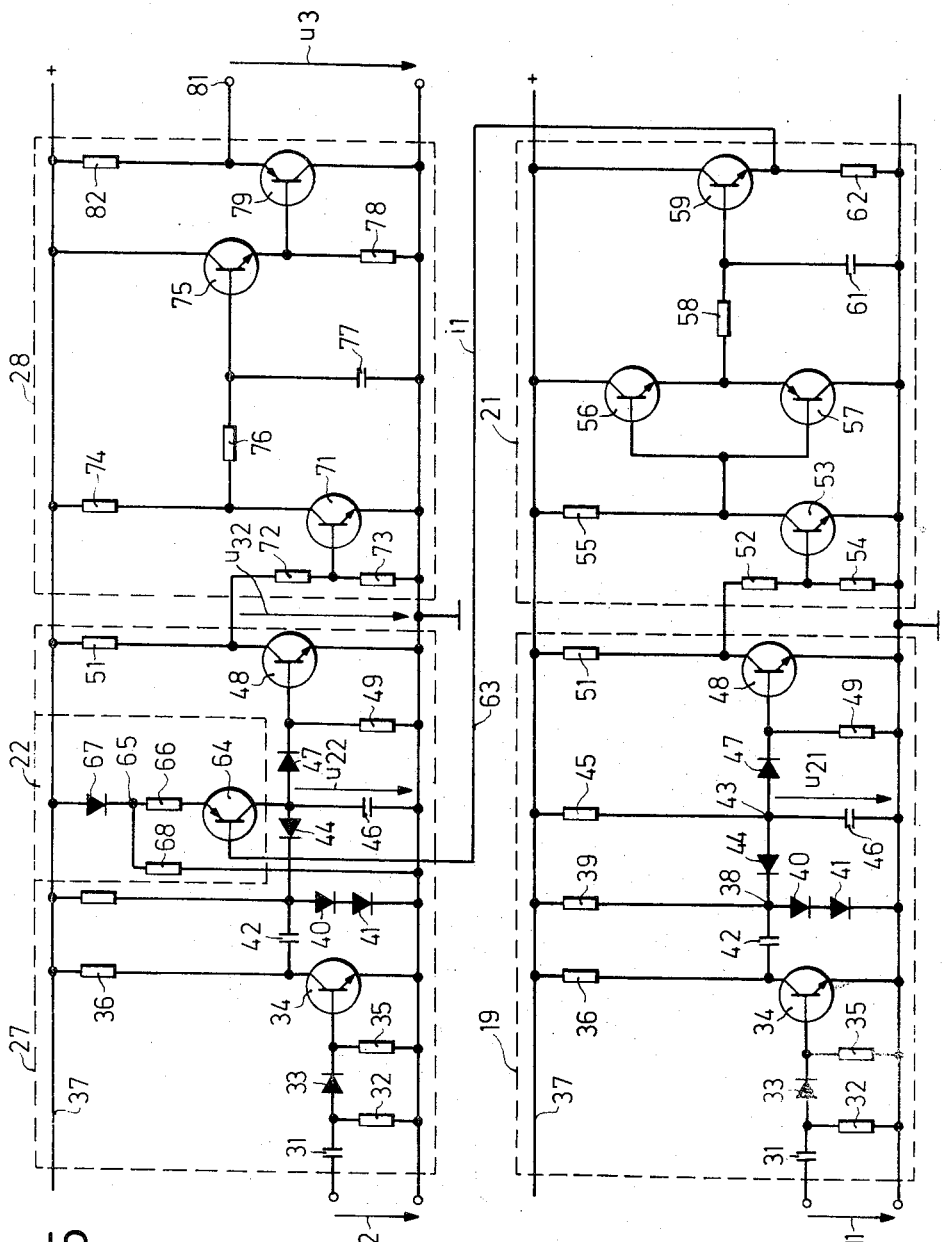
FIG. 5 is a circuit diagram of the circuits of the apparatus.

As in the circuit diagram shown in FIG. 5, the first and second flipflops 19 and 27 of FIG. 2 are in the form of a so-called pump circuit of the type described in German patent No. 12 23 937. The same reference numbers are used for the circuit components of the two monostable flipflops to the extent that they may have the same electrical values, and the circuit description of these flipflops will be given in reference to the first monostable flipflop 19.

The input voltage $u_{11}$ for the flipflop 19 is the output voltage of the first amplifier stage 18, which is supplied to the flipflop circuit through its input capacitor 31, the accumulation of charge on which is prevented by a leak resistor 32, the other side of which is grounded. A diode 33 is interposed between capacitor 31 and the base of an npn transistor 34. The base of transistor 34 is connected to ground over a resistor 35, while the emitter of that transistor is directly grounded. Its collector is connected to the positive potential supply bus 37 over a resistor 36. Between the positive bus 37 and a junction point 38 is a resistor 39, whereas between junction point 38 and ground there are provided two diodes 40 and 41 connected in series. The collector of transistor 34 is connected to junction point 38 through the capacitor 42.

Between junction point 38 and a further junction point 43 is a diode 44. A junction point 43 is connected to the ground through a charging capacitor 46 and to positive bus 37 by a charging resistor 45. Junction point 43 is also connected to a diode 47 to the base of an npn transistor 48 and also over a resistor 49 to ground. The collector of transistor 48 is connected to the positive bus 37 over a resistor 51. There is also a connection from the collector of transistor 48 to a first integrating stage 21, this being over a resistor 52 to the base of an npn transistor 53. The emitter of transistor 53, like that of resistors 34 and 48, is directly grounded. The base of transistor 53 is connected to ground over a resistor 54 and the collector of that transistor is connected to the positive bus 37 over a resistor 55.

The collector of transistor 53 has a connection to the base of an npn transistor 56 and to the base of a pnp transistor 57. The collector of the former is connected directly to the positive bus, while the collector of the latter is connected directly to ground. The emitters of transistors 56 and 57 are connected together and to a resistor 58, the other terminal of which is connected to the base of transistor 59 and to a capacitor 61, the other side of which is grounded. Transistor 59 is an npn transistor and has its collector connected directly to the positive bus 37, while its emitter is connected to ground over a resistor 62.

There is a connection 63 from the emitter of transistor 59 to the base of a pnp transistor 64 contained in the current-voltage converter 22. Between the emitter of transistor 64 and a junction point 65 is a resistor 66. The junction point 65 is connected to positive bus 37 over a diode 67 and to ground over a resistor 68. The collector of transistor 64 is connected to the junction point 43 of the second monostable flipflop circuit 27, so that in this second flipflop circuit 27 the voltage-to-current converter circuit 22 takes the place of resistor 45 of the first monostable flipflop 19.

Between the collector of transistor 48 of the second monostable flipflop 27 and the base of an npn transistor 71, the second integration stage 28 is connected to a resistor 72. Transistor 71 has its base connected to ground over a resistor 73, its emitter directly connected to ground and its collector connected to positive bus 37 over the resistor 74.

The collector of transistor 71 is further connected over a resistor 76 to the base of the transistor 75 at which point is connected also a capacitor 77, the other terminal of which is grounded. Transistor 75 has its collector directly connected to positive bus 37 and its emitter connected to ground over a resistor 78. Transistor 75 is an npn transistor and has its emitter directly connected to the base of a pnp transistor 79, of which the collector is directly grounded and the emitter is connected to the output terminal 81 in addition to being connected to positive bus 37 over a resistor 82.

As pointed out above, it is sufficient to generate the quotient $n_2/n_1$ as an analog voltage in order to determine the relative slip frequency between the two members 11 and 12 of the coupling shown in FIG. 1. It is known that the average d.c. voltage of a pulse train generally represented in FIG. 3 having the pulse height A, width t and period T may be calculated as follows:

$$U = A \cdot t/T \qquad 1.$$

If, now, it should be possible to provide an electrical pulse train in which the pulse width $t$ should be proportional to $1/n_1$ and the impulse period T proportional to $1/n_2$, then, since the number of periods contained in a fixed unit of time is inversely proportional to the length of the period, we would have for the d.c. average voltage:

$$U = n_2/n_1 \qquad 2.$$

Apparatus of the type shown in FIG. 2 makes possible the production of a rectangular voltage wave (pulse train) that satisfies the condition just stated.

The electro-magnetic induction pulse generator 15, 16, 17 produces a pulsing voltage $u_1$ with a pulse frequency proportional to the rotational rate $n_1$. The pulsing voltage $u_1$ is preferably then prepared for more effective utilization by means of an amplifying and pulse shaping stage 18. At the output of this first amplifying stage 18, there is accordingly available a pulsing voltage $u_{11}$ which closely approximates the form of rectangular impulses. This pulsing voltage $u_{11}$ triggers the first monostable flipflop, which is shown in detail in FIG. 5 and is of the type described as a pump circuit in German patent No. 12 23 937. The first flipflop 19 provides a voltage pulse sequence of which the individual pulses are all of the same width and of which the pulsing frequency is proportional to the first rotational rate $n_1$. At the output of the first integrating stage 21, following the first flipflop, there is obtained a steady voltage that varies downwards from a reference potential as the rotational rate $n_1$ increases. At the output of the current-voltage converter 22, which succeeds the first integration stage 21 in circuit sequence, there is produced a current $i_1$ of which the value increases linearly (i.e. in direct proportion) with increase of the rotational rate $n_1$.

The pulsing voltage $u_2$ produced by the second pulse generating sensor 23, 24, 25 is likewise preferably amplified and shaped, in this case in a second amplifier stage 26. The output voltage $u_{12}$ of this second amplifier stage triggers the second monostable flipflop 27. The operation of flipflop 27 differs from that of flipflop 19 in that instead of producing pulses of a width determined by fixed circuit components, it produces pulses of a width determined by the output current $i_1$ of the current-voltage converter 22, as more particularly described below with reference to FIG. 5. At the output of the second monostable flipflop, there is accordingly produced a pulsing voltage in which the pulse width $t_2$ is proportional to $1/n_1$. This pulse train is integrated in the second integration stage 28, so that at the output of the latter a steady voltage $u_3$ is obtained which is proportional to $n_2/n_1$.

The operation of the flipflops, referred to as pump circuits, will now be described with reference to the circuit diagram given in FIG. 5. In the first monostable flipflop 19, transistor 34 stays nonconducting in the absence of any input voltage $u_{11}$, because its base is grounded over resistor 35. Transistor 48, on the other hand, is conducting, because its base is connected to positive potential over the conducting diode 47 and resistor 45. The moment a positive pulse reaches the base of transistor 34, the latter becomes conducting. Immediately before that change in the condition of transistor 34, however, capacitor 42 had the opportunity to become charged to the positive power supply voltage over resistor 36 and diodes 40 and 41, and this charge remains in the moment that the base of transistor 34 receives a voltage pulse, with the result that the base of the previously conducting transistor 48 is driven into the region of negative potential with respect to ground. This action cuts off conductivity of transistor 48 and at the same time transfers a large part of the previous charge of capacitor 42 to capacitor 46. The voltage thus built up on capacitor 46 holds negative the base of transistor 48 considerably beyond the time at which transistor 34 returns to its nonconducting condition at the end of a pulse of the voltage wave $u_{11}$. The return of transistor 34 to its nonconducting condition has no influence on capacitor 46, for although diode 44 permits a transfer of charge from capacitor 46 to capacitor 42, it blocks any current in the opposite direction.

The discharge of capacitor 46 must rather take place over the relatively high resistance of resistor 45. The latter is chosen to have a value sufficiently high, in combination with the capacitance of capacitor 46 that the base potential of transistor 48 returns to ground potential and allows transistor 48 to resume its conducting quiescent state only after a considerable period of time.

In the second monostable flipflop 27, the place of resistor 45 of the first monostable flipflop 19 is taken, as previously mentioned, by the current-voltage converter 22. The latter provides for the charging of capacitor 46 a constant current, the value of which depends upon the base current $i_1$ of transistor 64. This current $i_1$ is, as already mentioned, proportional to the first rotation rate $n_1$. By means of transistors 56 and 57 in the first integration stage, provision is made to maintain strictly this proportionality. By means of diode 67, moreover, the temperature dependent quiescent voltage of transistor 56 is compensated, so that the steady current produced by transistor 64 is also independent of temperature.

FIG. 4 shows the variation with time of the voltage $u_{12}$ and the corresponding variation of the voltage $u_{22}$ at capacitor 46 for particular rotation rates $n_1$ and $n_2$.

By means of apparatus according to the present invention, the slip rate between the two halves of a coupling can be measured with little trouble and expense, since circuit components can be used of types that commonly find application in electronically automatized transmissions. The apparatus for measuring slip rates by the present invention, furthermore, is characterized by a high degree of accuracy of measurement. By its use, it is possible to obtain smooth shifting of gears regardless of the speed of the motor vehicle and of the torque of the motor.

The apparatus according to the invention can very accurately measure small slip rates because the circuits produce a current $i_1$ that has the correct value to a high degree of accuracy, comparable to the accuracy of the pulse rates. The greater the current $i_1$, the shorter the pulse width of $u_{22}$, and this effect also is produced with high accuracy to provide strictly inverse proportionality.

As previously mentioned, various kinds of sensors can be used to supply the rate indicating pulses to the circuits. Examples of the general type of inductive sensor above described in connection with FIG. 2 may be found more particularly described in German Offenlegungsschrift No. 19 35 518.1 and German Offenlegungsschrift No. 19 50 647.9.

We claim:

1. Apparatus for electrical determination of the differential rotational rate of two rotating members comprising:
    a first sensor means (15,16,17) adapted to produce a first signal ($u_1$) having a first frequency ($n_1$) proportional to the rotational rate of a first rotating member;
    a second signal ($u_2$) having a second frequency ($n_2$) proportional to the rotational rate of a second rotating member, and
    circuit means (18,19,21,22,27,28) responsive to said first and second signals arranged to generate a train of electrical voltage pulses of said second frequency of constant amplitude and of a pulse duration inversely proportional to said first frequency and to derive therefrom an electromotive force ($u_3$) proportional to the ratio of said frequencies ($n_2/n_1$).

2. Apparatus as defined in claim 1 in which said first and said second signals are each substantially in the form of a train of electrical voltage impulses having a period inversely proportional to the rotational rate of the rotating member (first or second, as the case may be) to which the signal (first or second, as the case may be) relates.

3. Apparatus as defined in claim 1 in which said circuit means (18,19,21,22,27,28) includes amplifiers (18 and 26), respectively adapted to amplify said first and said second signals and at the same time to function as pulse shaping circuits.

4. Apparatus as defined in claim 3 in which said circuit means (18,19,21,22,27,28) includes a first triggered pulse generating means (19) adapted to produce pulses having a width independent of the frequency ($n_1$) of said first signal.

5. Apparatus as defined in claim 4 in which said first triggered pulse generator (19) is a monostable flipflop comprising:
    a normally nonconducting grounded emitter input transistor having a charge transferring capacitor connected to its collector,
    a normally conducting grounded emitter output transistor,
    a charging capacitor adapted to be charged by said charge transferring capacitor through a diode when said input transistor is caused to switch to its conducting state
    a connection including a diode between said charging capacitor and the base of said output transistor and
    a discharging resistor connected between said charging capacitor and a source of positive voltage which is also connected to energize said transistors.

6. Apparatus as defined in claim 4 in which said first triggered pulse generator (19) is followed in circuit sequence by a first integration stage (21) and a voltage-current converter (22).

7. Apparatus as defined in claim 5 in which said circuit means (18,19,21,22,27,28) includes a second triggered pulse generator (27) adapted to generate pulses having a pulse width independent of the frequency (n₂) of said second signal, 8. Apparatus as defined in claim 7 in which said second triggered pulse generator (27) is a monostable flip-flop comprising:
- a normally nonconducting grounded emitter input transistor having a charge transferring capacitor connected to its collector,
- a normally conducting grounded emitter output transistor,
- a charging capacitor adapted to be charged by said charge transfer capacitor through a diode when said input transistor is caused to switch to its conducting state,
- a discharging circuit connected between aid charging capacitor and a positive voltage source and adapted to discharge said capacitor at a rate proportional to said frequency ($n_1$) of said first signal.

9. Apparatus as defined in claim 8 in which said charging circuit of said second triggered pulse generator is the output circuit of a voltage-current converter (22) driven by the output of said first triggered pulse generator through an integrating stage, whereby the width of the pulses produced by said second triggered pulse generator is inversely proportional to said output current ($i_1$) of said voltage-current converter (22).

10. Apparatus as defined in claim 9 in which an integration stage (28) is provided for integrating the output of said second triggered pulse generator (27).

11. Apparatus as defined in claim 1 in which said first and said second sensors are electro-magnetic induction pulse generators.

* * * * *